United States Patent
Pletzer et al.

(10) Patent No.: US 6,647,689 B2
(45) Date of Patent: Nov. 18, 2003

(54) PANEL, PARTICULARLY A FLOORING PANEL

(75) Inventors: Stefan Pletzer, Fieberbrunn (AT); Jürgen Weber, Ense (DE); Johann Heitzinger, Johann in Tirol (AT)

(73) Assignee: E.F.P. Floor Products GmbH, Tirol (AT)

(*) Notice: Subject to any disclaimer, the term of this patent is extended or adjusted under 35 U.S.C. 154(b) by 0 days.

(21) Appl. No.: 10/207,232

(22) Filed: Jul. 26, 2002

(65) Prior Publication Data

US 2003/0154681 A1 Aug. 21, 2003

Related U.S. Application Data

(63) Continuation of application No. PCT/EP02/01807, filed on Feb. 20, 2002.

(30) Foreign Application Priority Data

Feb. 18, 2002 (DE) .......................................... 102 06 877

(51) Int. Cl.[7] ................................................ E04F 15/04
(52) U.S. Cl. .................... 52/592.1; 52/589.1; 52/592.4; 403/364; 403/381
(58) Field of Search ............................ 52/403.1, 589.1, 52/591.1, 592.1, 592.4, 578, 591.3, 591.4; 403/282, 364, 375, 381

(56) References Cited

U.S. PATENT DOCUMENTS

| | | | |
|---|---|---|---|
| 21,432 A | * | 9/1858 | Tychsen ..................... 416/101 |
| 752,694 A | | 2/1904 | Lund |
| 753,791 A | | 3/1904 | Fulghum |
| 1,124,228 A | | 1/1915 | Houston |
| 1,776,188 A | | 9/1930 | Langbaum |
| 1,859,667 A | * | 5/1932 | Gruner ....................... 52/578 |
| 1,986,739 A | | 1/1935 | Mitte |
| 1,988,201 A | | 1/1935 | Hall |
| 2,276,071 A | | 3/1942 | Scull |
| 2,282,559 A | | 5/1942 | Byers |
| 2,430,200 A | | 11/1947 | Winston |

(List continued on next page.)

FOREIGN PATENT DOCUMENTS

| | | |
|---|---|---|
| AT | 305 566 | 3/1973 |
| CH | 200 949 | 1/1939 |
| CH | 488 891 | 5/1970 |
| CH | 513 310 | 11/1971 |
| DE | 921 484 | 12/1954 |
| DE | 1 212 275 | 3/1966 |
| DE | 1 534 802 | 4/1970 |
| DE | 1 959 794 | 6/1971 |
| DE | 71 02 476 | 6/1971 |
| DE | 2 007 129 | 9/1971 |
| DE | 1 534 278 | 11/1971 |

(List continued on next page.)

Primary Examiner—Brian E. Glessner
(74) Attorney, Agent, or Firm—Fish & Neave; Garry J. Tuma

(57) ABSTRACT

A panel, particularly a floor-covering panel, is provided that has separate horizontal and vertical locking structures. The panel has a first side edge and a second side edge. The first side edge has a groove and a locking lip, and the second side edge has a tongue and a locking tongue. The first side edge of one panel interlocks with the second side edge of another panel without adhesives or fasteners such that the tongue and groove form a joint that provides a vertical interconnection lock and the locking lip and locking tongue form a joint that provides a horizontal interconnection lock. Advantageously, one or more first side edge surfaces opposite surfaces of the second edge locking tongue have a space between them. The separate horizontal and vertical locking structures reduces, if not prevents, damage to the locking structures during joining of panels.

20 Claims, 8 Drawing Sheets

U.S. PATENT DOCUMENTS

| | | | |
|---|---|---|---|
| 2,740,167 A | 4/1956 | Rowley | |
| 2,808,624 A | 10/1957 | Sullivan | |
| 3,045,294 A | 7/1962 | Livezey | |
| 3,310,919 A | 3/1967 | Bue et al. | |
| 3,535,844 A | 10/1970 | Glaros | |
| 3,538,665 A | 11/1970 | Gohner | |
| 3,694,983 A | 10/1972 | Couquet | |
| 3,859,000 A | 1/1975 | Webster | |
| 4,074,496 A | 2/1978 | Fischer | |
| 4,104,840 A | 8/1978 | Heintz et al. | |
| 4,169,688 A | 10/1979 | Toshio | |
| 4,426,820 A | 1/1984 | Terbrack et al. | |
| 4,641,469 A | 2/1987 | Wood | |
| 4,769,963 A | 9/1988 | Meyerson | |
| 4,819,932 A | 4/1989 | Trotter, Jr. | |
| 5,029,425 A | 7/1991 | Bogataj | |
| 5,165,816 A | 11/1992 | Parasin | |
| 5,216,861 A | 6/1993 | Meyerson | |
| 5,274,979 A | 1/1994 | Tsai | |
| 5,295,341 A | 3/1994 | Kajiwara | |
| 5,349,796 A | 9/1994 | Meyerson | |
| 5,404,686 A | 4/1995 | Esposito | |
| 5,502,939 A | 4/1996 | Zadok et al. | |
| 5,706,621 A | 1/1998 | Pervan | |
| 5,797,237 A | 8/1998 | Finkell, Jr. | |
| 5,860,267 A | 1/1999 | Pervan | |
| 6,006,486 A | 12/1999 | Moriau et al. | |
| 6,023,907 A | 2/2000 | Pervan | |
| 6,094,882 A | 8/2000 | Pervan | |
| 6,101,778 A | 8/2000 | Mårtensson | |
| 6,182,410 B1 | 2/2001 | Pervan | |
| 6,209,278 B1 | 4/2001 | Tychsen | |
| 6,216,409 B1 | 4/2001 | Roy et al. | |
| 6,247,285 B1 | 6/2001 | Moebus | |
| 6,332,733 B0 | 12/2001 | Hamberger et al. | |
| 6,345,481 B1 | 2/2002 | Nelson | |
| 6,385,936 B1 * | 5/2002 | Schneider | 52/589.1 |
| 6,418,683 B1 * | 7/2002 | Martensson et al. | 52/282.1 |
| 2003/0041545 A1 * | 3/2003 | Stanchfield | 52/592.1 |

FOREIGN PATENT DOCUMENTS

| | | | | |
|---|---|---|---|---|
| DE | 2 238 660 | 2/1974 | | |
| DE | 74 02 354 | 5/1974 | | |
| DE | 25 02 992 | 7/1976 | | |
| DE | 26 16 077 | 10/1977 | | |
| DE | 29 17 025 | 11/1980 | | |
| DE | 67928703.8 | 7/1981 | | |
| DE | 30 33 907 | 5/1982 | | |
| DE | 81 34 756.1 | 5/1982 | | |
| DE | 30 41 781 | 6/1982 | | |
| DE | 32 46 376 | 6/1984 | | |
| DE | 33 43 601 | 6/1985 | | |
| DE | 86 04 004.9 | 6/1986 | | |
| DE | 35 44 845 | 6/1987 | | |
| DE | 91 02 141.3 | 5/1992 | | |
| DE | 92 12 445.3 | 1/1993 | | |
| DE | 41 30 115 | 3/1993 | | |
| DE | 93 00 306.4 | 4/1993 | | |
| DE | 42 15 273 | 11/1993 | | |
| DE | 42 42 530 | 6/1994 | | |
| DE | 44 00 572 | 8/1994 | | |
| DE | 94 14 636.5 | 3/1995 | | |
| DE | 93 17 191.9 | 4/1995 | | |
| DE | 44 02 352 | 8/1995 | | |
| DE | 295 11 769 | 11/1995 | | |
| DE | 295 13 007 | 11/1995 | | |
| DE | 295 17 128 | 2/1996 | | |
| DE | 195 14 165 | 3/1996 | | |
| DE | 195 03 948 | 8/1996 | | |
| DE | 296 09 590 | 8/1996 | | |
| DE | 296 08 195 | 9/1996 | | |
| DE | 195 11 766 | 10/1996 | | |
| DE | 195 12 423 | 10/1996 | | |
| DE | 295 20 966 | 10/1996 | | |
| DE | 296 10 462 | 10/1996 | | |
| DE | 296 19 983 | 2/1997 | | |
| DE | 297 03 962 | 6/1997 | | |
| DE | 297 10 175 | 9/1997 | | |
| DE | 297 16 028 | 12/1997 | | |
| DE | 297 19 986 | 3/1998 | | |
| DE | 298 03 708 | 7/1998 | | |
| DE | 197 09 641 | 9/1998 | | |
| DE | 694 13 391 | 9/1998 | | |
| DE | 197 18 319 | 11/1998 | | |
| DE | 298 15 780 | 6/1999 | | |
| DE | 299 11 462 | 12/1999 | | |
| DE | 694 21 945 | 12/1999 | | |
| DE | 694 22 838 | 1/2000 | | |
| DE | 298 23 749 | 2/2000 | | |
| DE | 198 51 200 | 3/2000 | | |
| DE | 298 22 341 | 4/2000 | | |
| DE | 299 22 649 | 4/2000 | | |
| DE | 200 02 413 | 5/2000 | | |
| DE | 299 21 814 | 5/2000 | | |
| DE | 198 51 656 | 6/2000 | | |
| DE | 200 00 484 | 6/2000 | | |
| DE | 200 04 359 | 6/2000 | | |
| DE | 198 59 038 | 7/2000 | | |
| DE | 199 01 595 | 8/2000 | | |
| DE | 200 01 225 | 8/2000 | | |
| DE | 200 01 788 | 8/2000 | | |
| DE | 296 23 914 | 8/2000 | | |
| DE | 200 05 877 | 11/2000 | | |
| DE | 200 12 913 | 11/2000 | | |
| DE | 200 13 380 | 12/2000 | | |
| DE | 297 24 334 | 1/2001 | | |
| DE | 10008108 C1 * | 5/2001 | | E04F/15/02 |
| DE | 10062873 A1 * | 7/2002 | | E04F/13/08 |
| EP | 0 196 672 | 10/1986 | | |
| EP | 0 248 127 | 12/1987 | | |
| EP | 0 637 659 | 2/1995 | | |
| EP | 0 652 340 | 5/1995 | | |
| EP | 0 665 347 | 8/1995 | | |
| EP | 0 690 185 | 1/1996 | | |
| EP | 0 715 037 | 6/1996 | | |
| EP | 0 733 756 | 9/1996 | | |
| EP | 0 790 369 | 8/1997 | | |
| EP | 0 843 763 | 5/1998 | | |
| EP | 0 855 482 | 7/1998 | | |
| EP | 0 877 130 | 11/1998 | | |
| EP | 0 906 994 | 4/1999 | | |
| EP | 0 969 163 | 1/2000 | | |
| EP | 0 969 164 | 1/2000 | | |
| EP | 0 976 889 | 2/2000 | | |
| EP | 1 024 234 | 8/2000 | | |
| EP | 1 026 340 | 8/2000 | | |
| EP | 1 026 341 | 8/2000 | | |
| EP | 1223266 A2 * | 7/2002 | | E04F/15/04 |
| FR | 1 175 582 | 3/1959 | | |
| FR | 1 293 043 | 4/1962 | | |
| FR | 2 102 505 | 4/1972 | | |
| FR | 2 487 407 | 1/1982 | | |
| FR | 2 568 295 | 1/1986 | | |
| FR | 2 630 149 | 10/1989 | | |
| FR | 2 691 491 | 11/1993 | | |
| FR | 2 697 275 | 4/1994 | | |
| GB | 424 057 | 2/1935 | | |
| GB | 463 190 | 3/1937 | | |
| GB | 614 394 | 12/1948 | | |
| GB | 1 381 986 | 1/1975 | | |

| | | |
|---|---|---|
| GB | 1 430 423 | 3/1976 |
| GB | 2 117 813 | 10/1983 |
| GB | 2 243 381 | 10/1991 |
| GB | 2 256 023 | 11/1992 |
| JP | 54-65528 | 5/1979 |
| JP | 56-88825 | 7/1981 |
| JP | 57-119056 | 7/1982 |
| JP | 64-14838 | 1/1989 |
| JP | 1-35858 | 11/1989 |
| JP | 2-9243 | 1/1990 |
| JP | 3-46645 | 4/1991 |
| JP | 3-107056 | 5/1991 |
| JP | 3-169967 | 7/1991 |
| JP | 4-297654 | 10/1992 |
| JP | 5-25916 | 2/1993 |
| JP | 6-146553 | 5/1994 |
| JP | 6-200611 | 7/1994 |
| JP | 6-56310 | 8/1994 |
| JP | 6-320510 | 11/1994 |
| JP | 7-13967 | 3/1995 |
| JP | 7-180333 | 7/1995 |
| JP | 7-292944 | 11/1995 |
| JP | 8-109734 | 4/1996 |
| JP | 9-13631 | 1/1997 |
| JP | 9-256604 | 9/1997 |
| WO | 84/02155 | 6/1984 |
| WO | 87/07667 | 12/1987 |
| WO | 93/13280 | 7/1993 |
| WO | 94/01628 | 1/1994 |
| WO | 94/04773 | 3/1994 |
| WO | 94/26999 | 11/1994 |
| WO | 95/06176 | 3/1995 |
| WO | 96/06248 | 2/1996 |
| WO | 96/18782 | 6/1996 |
| WO | 96/23942 | 8/1996 |
| WO | 96/27719 | 9/1996 |
| WO | 96/27721 | 9/1996 |
| WO | 97/47834 | 12/1997 |
| WO | 98/21428 | 5/1998 |
| WO | 98/22677 | 5/1998 |
| WO | 98/24995 | 6/1998 |
| WO | 98/40583 | 9/1998 |
| WO | 98/58142 | 12/1998 |
| WO | 99/14452 | 3/1999 |
| WO | 99/40273 | 8/1999 |
| WO | 99/66151 | 12/1999 |
| WO | 99/66152 | 12/1999 |
| WO | 01/66875 | 9/2001 |
| WO | 01/66876 | 9/2001 |

\* cited by examiner

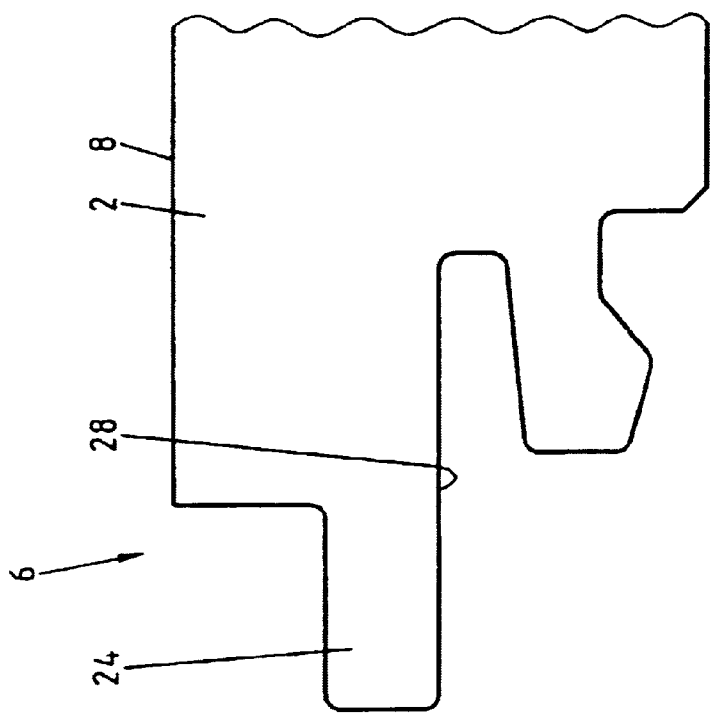
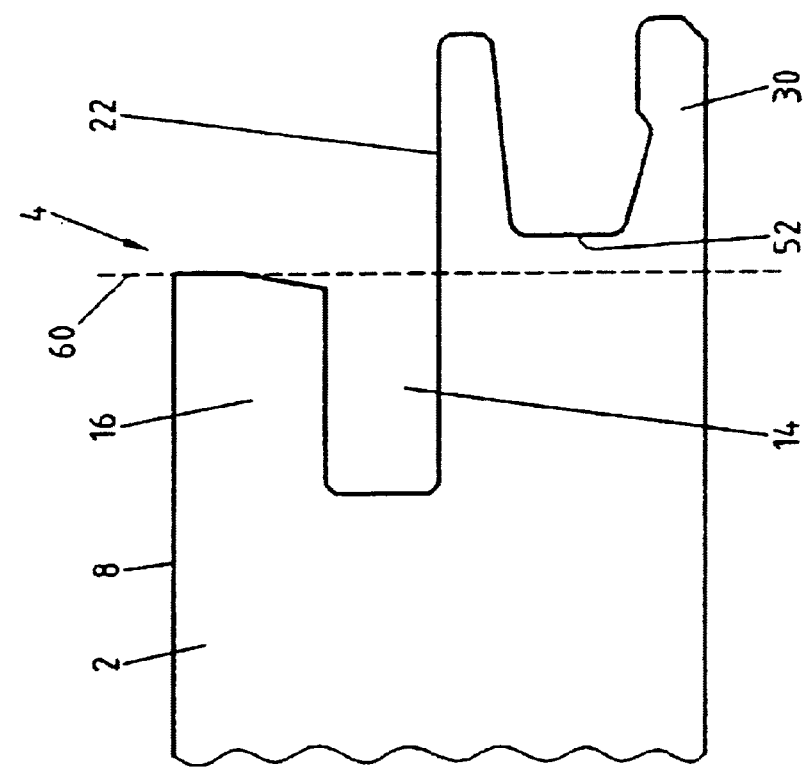
Fig.6

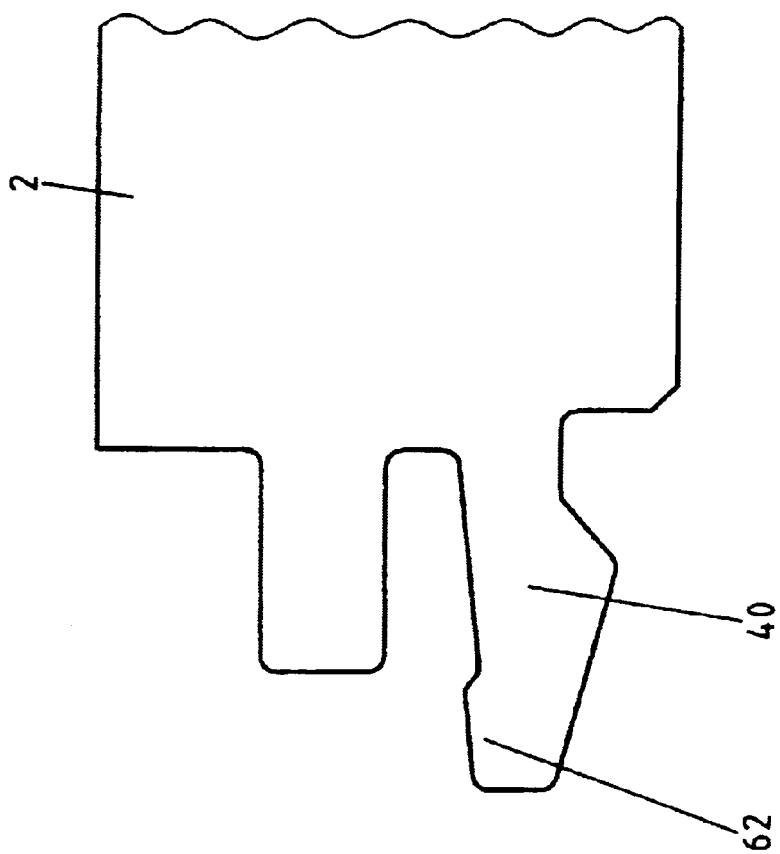
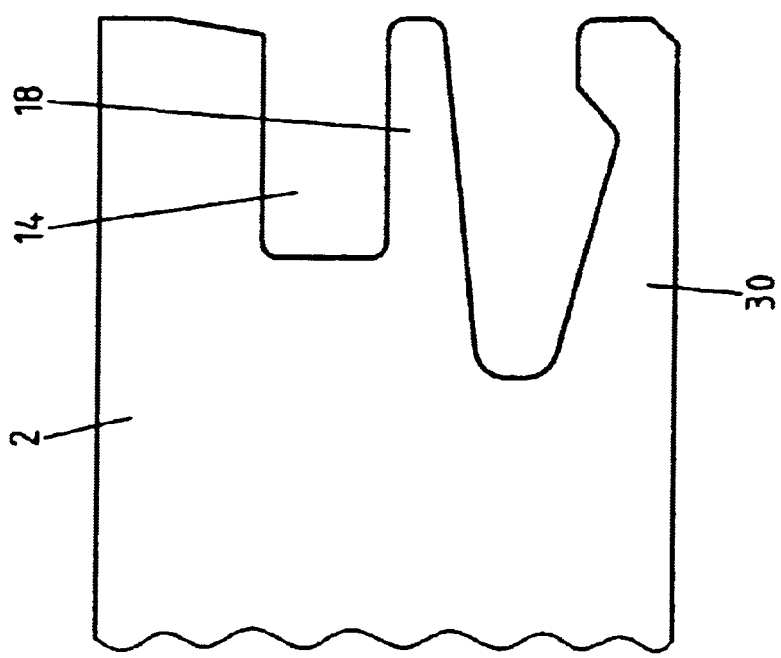
Fig.8

PANEL, PARTICULARLY A FLOORING PANEL

CROSS REFERENCE TO RELATED APPLICATIONS

This is a continuation of copending, commonly assigned International Patent Application No. PCT/EP02/01807, filed Feb. 20, 2002, which is incorporated by reference herein in its entirety. This also claims the benefit of German Patent Application No. 102 06 877.1, filed Feb. 18, 2002, which is also incorporated by reference herein in its entirety.

BACKGROUND OF THE INVENTION

This invention relates to a panel, particularly a flooring panel, which can be mechanically interlocked with other identical panels.

These types of panels are commonly used for floor coverings, such as, for example, parquet or laminate floor coverings. These types of panels can also be used to cover other surfaces such as ceilings and walls. Often, wooden materials are used to fabricate such panels, particularly, for example, particle board, MDF (medium density fiberboard) boards and HDF (high density fiberboard) boards. Alternatively, plastics can be used.

Individual panels are installed by mechanically joining (i.e., interlocking) them into a flat whole. Preferably, the panels are laid without adhesive or additional mechanical fasteners (e.g., screws or nails). This advantageously allows them to be more easily replaced or removed without damage.

A known panel has a tongue-and-groove joint for locking interconnected panels in the vertical direction. A metal strip mounted on and extending outward from the bottom of one panel engages a corresponding groove in the bottom of another panel for locking the interconnected panels in the horizontal direction. A "vertical lock" limits or prevents interlocked panels from moving relative to each other in the vertical direction, while a "horizontal lock" limits or prevents interlocked panels from moving relative to each other in the horizontal direction. The bottom of the groove and the top of the tongue are usually aligned substantially parallel to the top of the panel such that a preferably exact vertical fit of interconnected panels is achieved (i.e., the top surfaces of the interconnected panels lie in the same plane).

Improvements to this panel are also known (see, e.g., WO 01/66876 and WO 01/48331). In such improved panels, a tongue-and-groove joint provides the vertical lock and a locking-lip-and-tongue joint provides the horizontal lock. Both sets of locking structures are preferably formed integrally with the panel. The locking lip is implemented on the same side edge as the tongue and the locking tongue is implemented on the same side edge as the groove. In many such panels, the locking tongue also simultaneously serves as the lower lip of the groove, thus playing a role-in both vertical and horizontal locking of interconnected panels.

The locking lip is typically the only structure that is elastically deformed (usually downward) during the interconnection of two panels. This downward deformation allows the locking lip to fully engage the locking tongue. However, because the top of the locking tongue abuts the bottom of the tongue-and-groove tongue, the locking tongue typically cannot bend upward, providing no relief to the interconnection force applied to the locking lip. In some cases, this may cause the locking lip to bend too far downward, which can damage the panel by causing fine cracks in the region of the locking lip. This can weaken and perhaps ruin the panel interconnection.

In view of the foregoing, it would be desirable to be able to provide a panel having integrally formed vertical and horizontal locking structures that are not likely to be damaged when such panels are interconnected.

SUMMARY OF THE INVENTION

It is an object of this invention to provide a panel having integrally formed vertical and horizontal locking structures that are not likely to be damaged when such panels are interconnected.

A panel constructed in accordance with the invention has first and second side edges preferably opposite each other. The first side edge can be interlocked with the second side edge of another panel of the invention. The side edges have upper lateral faces running substantially perpendicular to the top of the panel. The first side edge has a groove extending parallel to the first side edge delimited by an upper lip and a lower lip. The second side edge has a tongue extending parallel to the second side edge. The first and second side edges interlock such that the upper lateral faces abut one another and the tongue fits in the groove (i.e., the top of the tongue abuts the bottom of the upper lip, and the bottom of the tongue abuts the top of the lower lip).

The first side edge further includes a locking lip at a distance from the lower lip. The locking-lip has a locking face running at a slant with respect to the bottom of the panel. Preferably, the locking face is an inclined surface. The inclined surface preferably has a positive slope (i.e., the surface extends upward toward the second side edge of another panel).

The second side edge further includes a locking tongue at a distance from the first tongue. The locking tongue has a locking face running at a slant with respect to the bottom of the panel. As above, the locking face is preferably an inclined surface preferably having a positive slope.

A panel constructed according to the invention thus has a locking tongue on the same side edge as the tongue of the tongue-and-groove joint and has a locking lip on the same side edge (preferably opposite the other side edge) as the groove of the tongue-and-groove joint. The first side edge of one panel interlocks the second side edge of another panel such that the locking face of the locking lip butts against the locking face of the locking tongue.

Advantageously, in the locked state, an interval (i.e., a space) is provided between the bottom of the lower lip and the top of the locking tongue. This interval advantageously allows the locking tongue to deform elastically upward during joining, preferably resulting in the locking lip deforming less downward. This reduces, if not prevents, the likelihood of damage to the locking structures. In addition, the interval allows relative movement of both the tongue-and-groove joint and the locking-lip-and-tongue joint should mechanical stress (e.g., a person standing) near the interlocked side edges occur. This further avoids damage to the locking structures.

The size of the interval need only be large enough to prevent a "fit" between the bottom of the lower lip and the top of the locking tongue. That is, the interval should be large enough to prevent the bottom of the lower lip from abutting the top of the locking tongue. If a fit did occur (i.e., those surfaces were in contact with each other), a double fit would exist between that and the tongue-and-groove joint. This would be technically difficult to implement reliably because of production tolerances. The interval should therefore be greater than about 0.05 mm, preferably greater than about 0.1 mm, and more preferably greater than about 0.5 mm.

Preferably, another interval (i.e., another space) is also provided in the locked state between the distal end surface of the locking tongue and the back surface or base of the groove or depression formed by the lower lip and the locking lip. This interval supplements the interval described above. Preferably, only the bottom of the locking tongue abuts the locking lip.

In sum, the locking structures are integrally formed as part of a one-piece panel in which the vertical and horizontal locking structures of the panel are advantageously completely separate and distinct from each other. They are separate and distinct because the tongue and groove form no part of the locking lip and locking tongue and vice versa.

Panels of the invention preferably also include an additional step or plane in the side edge profile to additionally protect against the penetration of moisture.

Some embodiments of the invention preferably have the distal end of the locking tongue extending beyond the distal end of the tongue-and-groove tongue. This is likely to result in delivery of the impact or interconnection force solely by the distal end of the locking tongue during the joining of the panels. This protects all other projecting structures of both side edges. In particular, the upper lateral face of the first panel, which forms a part of the aesthetically important visible joint edge between both panels, and the elements of the tongue-and-groove joint, are advantageously not subjected to the applied impact force and thus remain undeformed.

In another embodiment of the invention, a projecting rib or protrusion is provided at the lower end of the upper lateral face of the first side edge, and a corresponding depression or indentation sized to receive the protrusion is provided at the lower end of the upper lateral face of the second side edge. The protrusion engages the indentation in the locked state. This engagement defines the exact position of the forward end of the upper lip, through which displacement of the upper lip caused by stress of the panels near the side edges or by penetration of moisture is reduced if not prevented. Note that the protrusion and indentation feature is independent of the other embodiments and may be used in other tongue-and-groove joints with or without mechanical locking.

In a further embodiment of the invention, the base of the depression delimited between the lower lip and the locking lip projects beyond a plane substantially perpendicular to the top of the panel and substantially aligned with the upper lateral face of the first side edge. In other words, the back surface of a second groove formed by the lower lip of the first groove (of the tongue-and-groove joint) and the locking lip is located beyond (i.e., further outward or forward on the first side edge than) the plane substantially aligned with the upper lateral face of the first side edge.

This embodiment has the advantage of not transmitting forces received by the panels near the side edges directly downward onto the horizontal locking structures. In particular, a solid region (i.e., a region with no grooves or depressions) is positioned directly below the side edges, so that applied forces (from, e.g., a table or chair leg) do not lead directly to deformation of the elastic elements of the horizontal lock, which are positioned beyond the upper lateral face of the first side edge. Another advantage is that the bottom of the tongue and the top of the lower lip are greatly lengthened and form an expanded contact surface.

Finally, in still another embodiment of the invention, the forward end of the locking tongue has an enlarged outer shape, which in the locked state, fits or butts against the bottom of the lower lip in the second groove formed by the lower lip and the locking lip. An interval still exists between the remaining top portion of the locking tongue (i.e., the non-enlarged portion) and the lower lip and thus the freedom of movement of the locking tongue is not restricted. The fit at the distal (i.e., forward) end of the locking tongue results in a more stable horizontal lock. Advantageously, the tongue-and-groove joint is not adversely affected by this, because the horizontal extent of the fit of the tongue-and-groove joint inside the profile of the edges does not vertically overlap the horizontal extent of the fit at the distal end of the locking tongue. A double fit therefore does not occur in this region.

In sum, panels of the invention ensure that the locking structures which are expected to deform as a result of the joining of panels can do so without being damaged and without impairing the fit of other locking structures whose precise shape is needed for the exact fit of one panel with another. Advantageously, this reliable joining of panels is achieved by having completely separate vertical and horizontal locking structures, with an interval between the locking tongue and the lower lip.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 6 shows respective opposing edge profiles of the two panels of FIG. 5;

FIG. 8 shows respective opposing edge profiles of the two panels of FIG. 7.

DETAILED DESCRIPTION OF THE INVENTION

Figure 1:
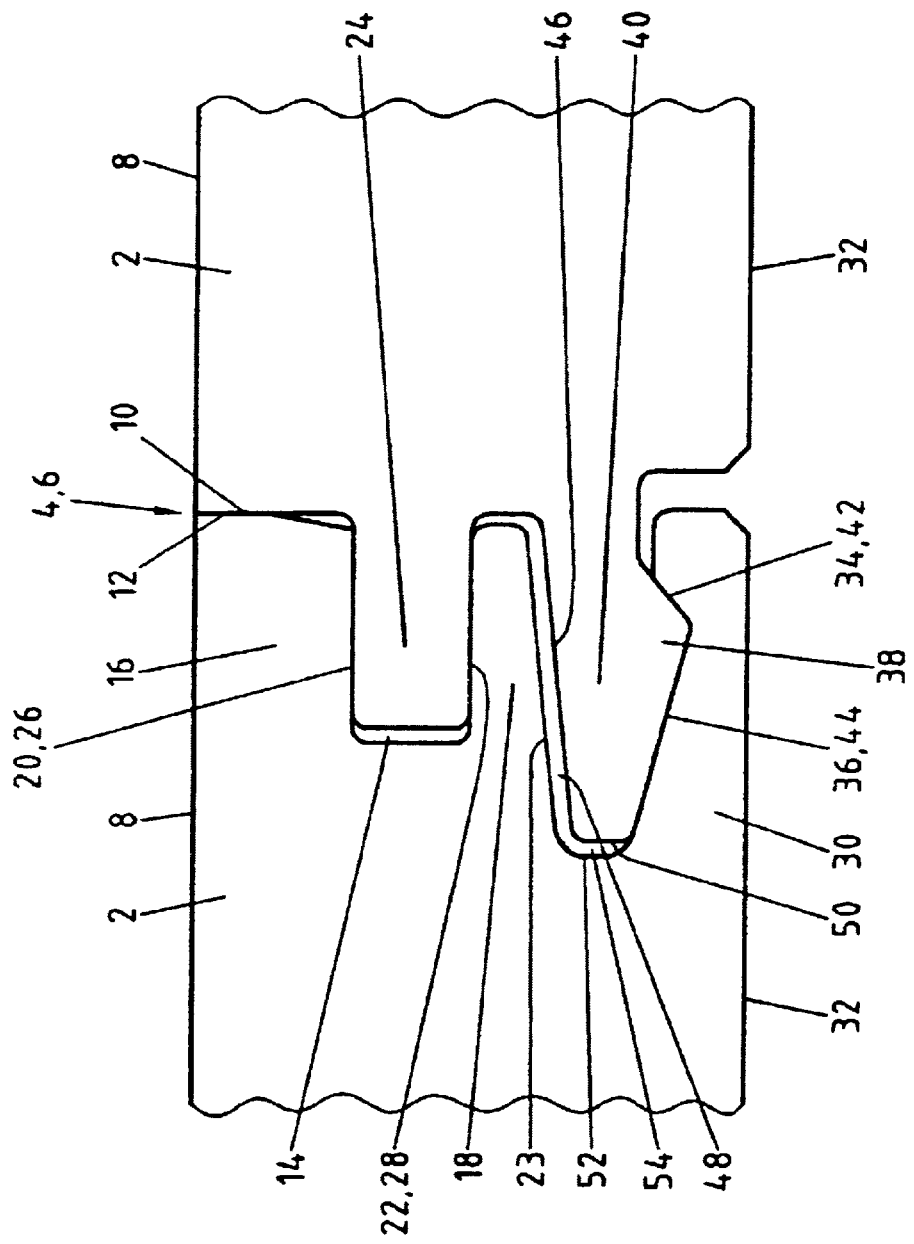
FIG. 1 shows a first exemplary embodiment of an edge profile of two interlocked panels according to the invention.
Figure 2:
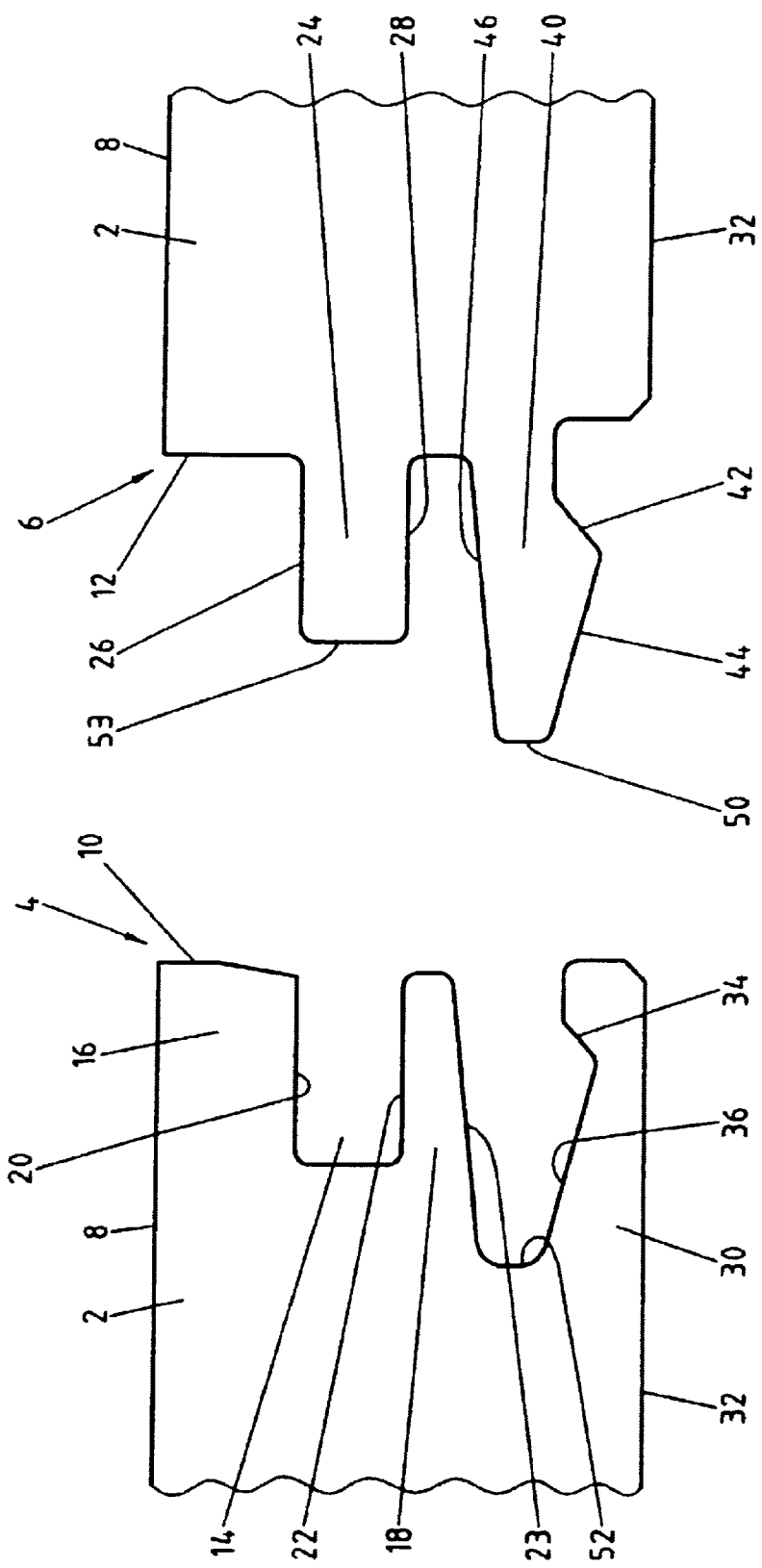
FIG. 2 shows respective opposing edge profiles of the two panels of FIG. 1.

FIGS. 1 and 2 show the edge profiles of a first exemplary embodiment of two panels 2 according to the invention. Each panel 2 has corresponding edge profiles on preferably opposite side edges 4 and 6, so that multiple panels 2 may be locked and joined with one another into a whole that results in, for example, a floor covering. Panels 2 can also be used to cover other surfaces, such as, for example, walls or ceilings. To more easily describe the interconnection of corresponding edge profiles, portions of two panels 2 are shown in the region of side edges 4 and 6.

First side edge 4 and second side edge 6 have upper lateral faces 10 and 12, respectively, running substantially perpendicular from top 8 of panel 2. Lateral faces 10 and 12 define the relative horizontal position of two panels 2 in the locked state. In other words, panels 2 abut one another at lateral faces 10 and 12 in the locked state.

First side edge 4 has a groove 14 extending parallel to first side edge 4. Groove 14 is formed by an upper lip 16 and a lower lip 18. Upper lip 16 has a bottom 20 facing groove 14, and lower lip 18 has a top 22 facing groove 14. Lower lip 18 also has a bottom 23.

Second side edge 6 has a tongue 24 extending parallel to second side edge 6. Tongue 24 has a top 26 and a bottom 28.

First side edge 4 of one panel interlocks with second side edge 6 of another panel such that bottom 20 of upper lip 16 abuts top 26 of tongue 24 and top 22 of lower lip 18 abuts bottom 28 of tongue 24. This achieves a tongue-and-groove joint that effects a vertical lock and thus a vertical justification of panels 2 in relation to one another.

A locking lip 30 is further provided on first side edge 4 at a distance from lower lip 18. Locking lip 30 has a locking face 34 running at preferably a slant to bottom 32 of panel 2. In this case, the slant preferably has a positive slope and is used to effect a horizontal lock of panels 2 with one another. Alternatively, locking face 34 may be aligned substantially perpendicular to bottom 32; however, implementing locking face 34 at an angle of less than 90° is preferred. Locking lip 30 also has a contact surface 36, which preferably also runs at a slant to bottom 32; however this slant is opposite the slant of locking face 34.

Corresponding to locking lip 30 is a locking tongue 40 on second side edge 6. Locking tongue 40 is located at a distance from tongue 24 and has a locking face 42 running at a slant to bottom 32 of panel 2. Locking tongue 40 also has a contact surface 44. Surface 44 and face 42 form locking element 38 and correspond respectively in their alignment to the alignment of surface 36 and face 34 of locking lip 30.

In the locked state, locking face 34 of locking lip 30 butts against locking face 42 of locking tongue 40. An interval 48 is provided between top 46 of locking tongue 40 and bottom 23 of lower lip 18. Interval 48 allows locking tongue 40 to deform upward during joining of panels 2. Thus locking lip 30 is not the only structure that can be elastically deformed for thickness compensation upon insertion of locking element 38.

In the locked state, an interval 54 is also preferably provided between distal end surface 50 of locking tongue 40 and base or back surface 52 of the depression or groove formed by lower lip 18 and locking lip 30. This additional space further increases the freedom of movement of locking tongue 40.

Furthermore, as shown in FIGS. 1 and 2, distal end surface 50 of locking tongue 40 preferably extends beyond distal end surface 53 of tongue 24. Distal end surface 50 of locking tongue 40 may therefore be used as a contact point for an impact force during the joining of panels, while the other projecting structures are advantageously not directly subjected to any force and are thus not deformed by the impact force during joining.

Figure 3:
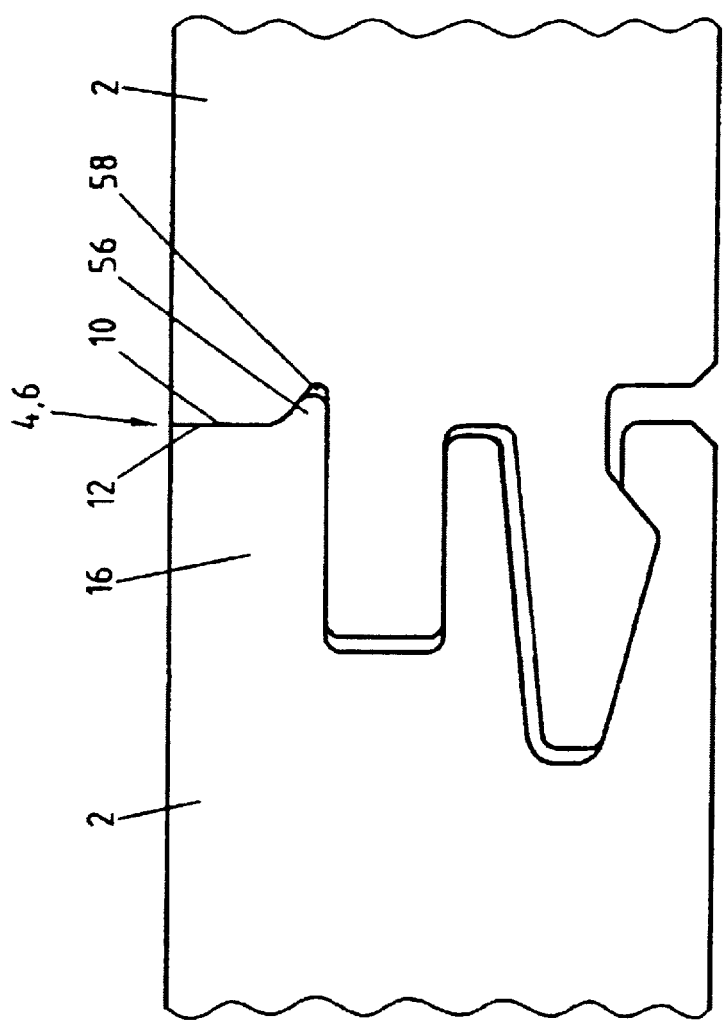
FIG. 3 shows a second exemplary embodiment of an edge profile of two interlocked panels according to the invention.
Figure 4:
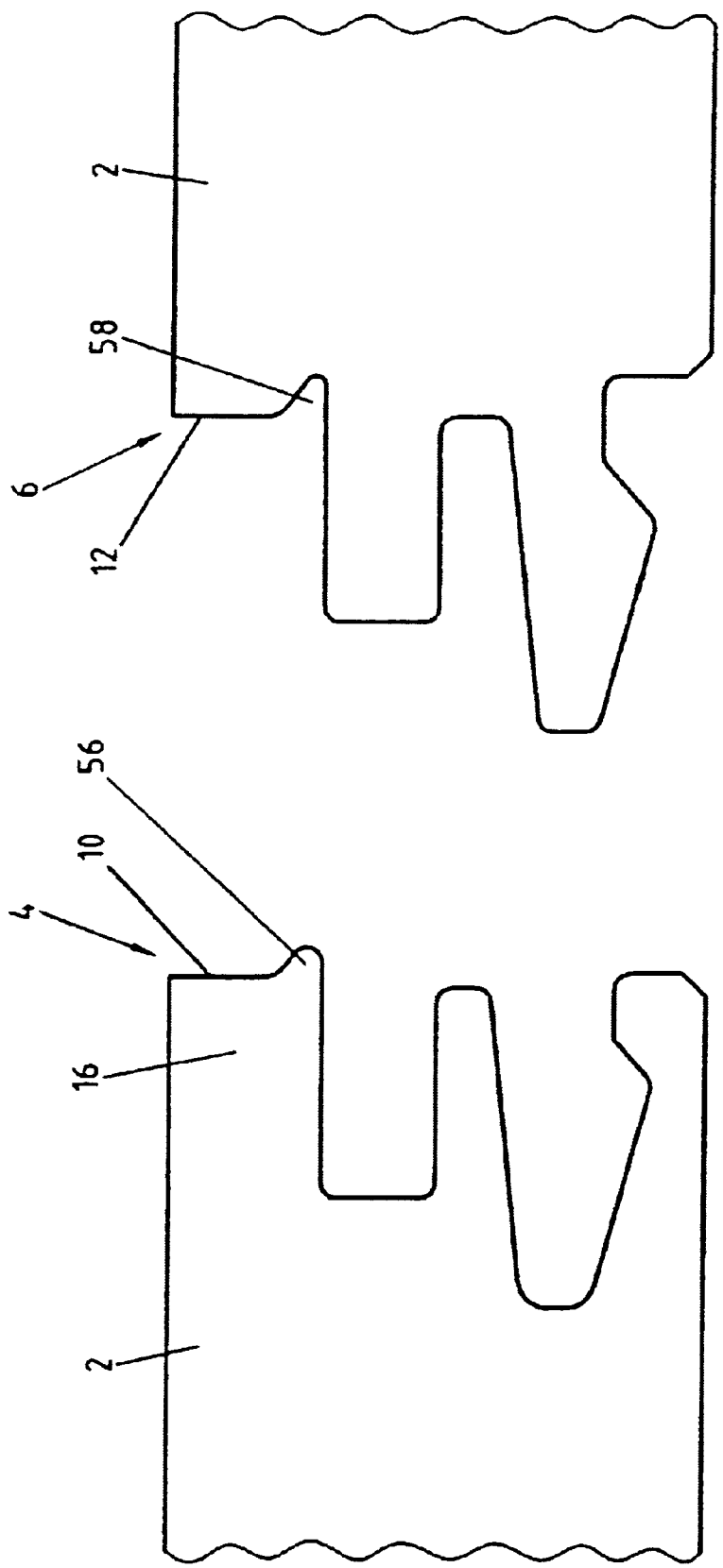
FIG. 4 shows respective opposing edge profiles of the two panels of FIG. 3.

FIGS. 3 and 4 illustrate a second embodiment of the invention. Note that identical reference numbers are used for identical components. Moreover, because this embodiment differs generally from the embodiment shown in FIGS. 1 and 2 by one feature, all previous reference numbers are not shown for clarity.

The one feature is a projecting rib or protrusion 56 provided at the lower end of upper lateral face 10 of first side edge 4 and a depression or indentation 58 provided at the lower end of upper lateral face 12 of second side edge 6. The shapes of protrusion 56 and indentation 58 are at least partially tailored to one another, so that in the locked state, protrusion 56 is engaged with indentation 58. This prevents upper lip 16 from being displaced at the completion of the joining of panels 2 or in the course of time by a stress of panels 2 in the region of side edges 4 and 6. Such a displacement may result in one panel rising higher than the adjacent panel, causing an undesirable edge between the two interlocked panels.

Figure 5:
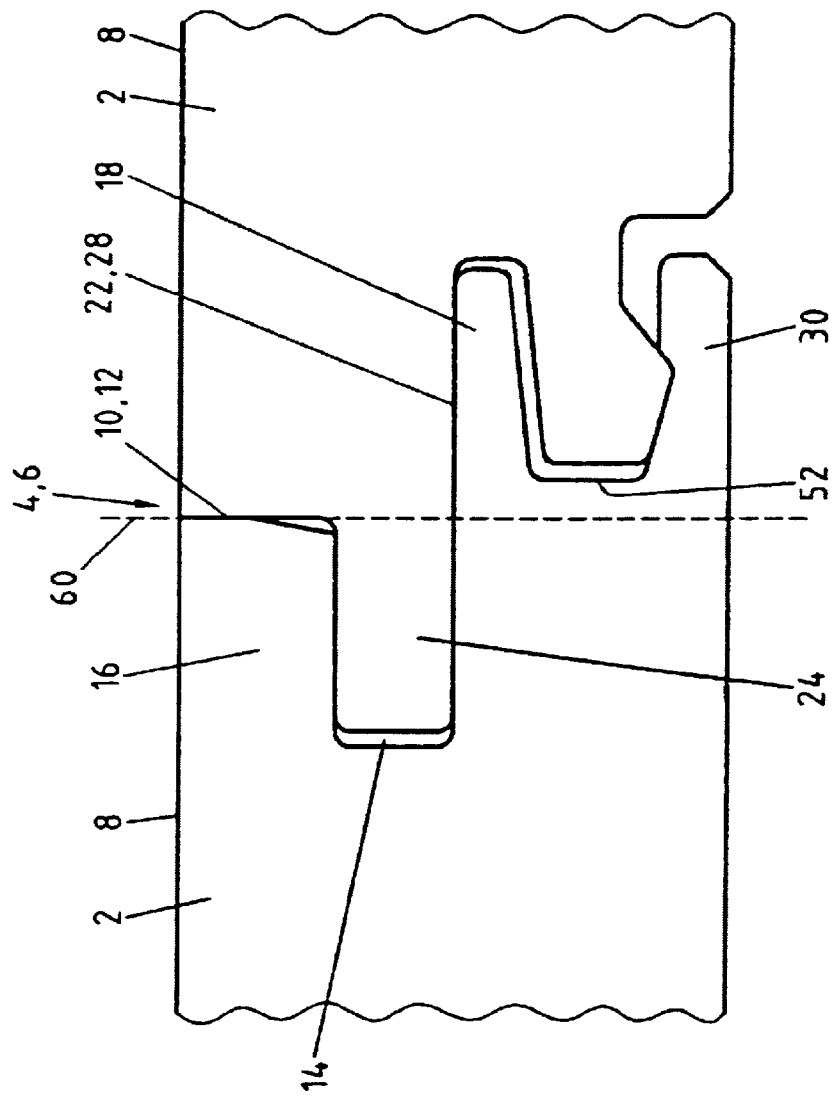
FIG. 5 shows a third exemplary embodiment of an edge profile of two interlocked panels according to the invention.

FIGS. 5 and 6 illustrate a third exemplary embodiment of the invention. As in other embodiments, identical reference numbers refer to identical components (even if they are dimensioned differently).

In this embodiment, back surface 52 of the groove formed by lower lip 18 and locking lip 30 is located beyond a plane 60 aligned with upper lateral face 10 of first side edge 4. In other words, the plane indicated by line 60, which runs perpendicular to top 8 along lateral face 10, does not intersect locking lip 30.

Surfaces 22 and 28 of tongue 24 and lower lip 18, respectively, which abut one another in the locked state, are therefore enlarged in this configuration and a force applied on the region of side edges 4 and 6, such as from a person or piece of furniture positioned over the side edges, is not relayed directly to the horizontal locking structures.

Figure 7:
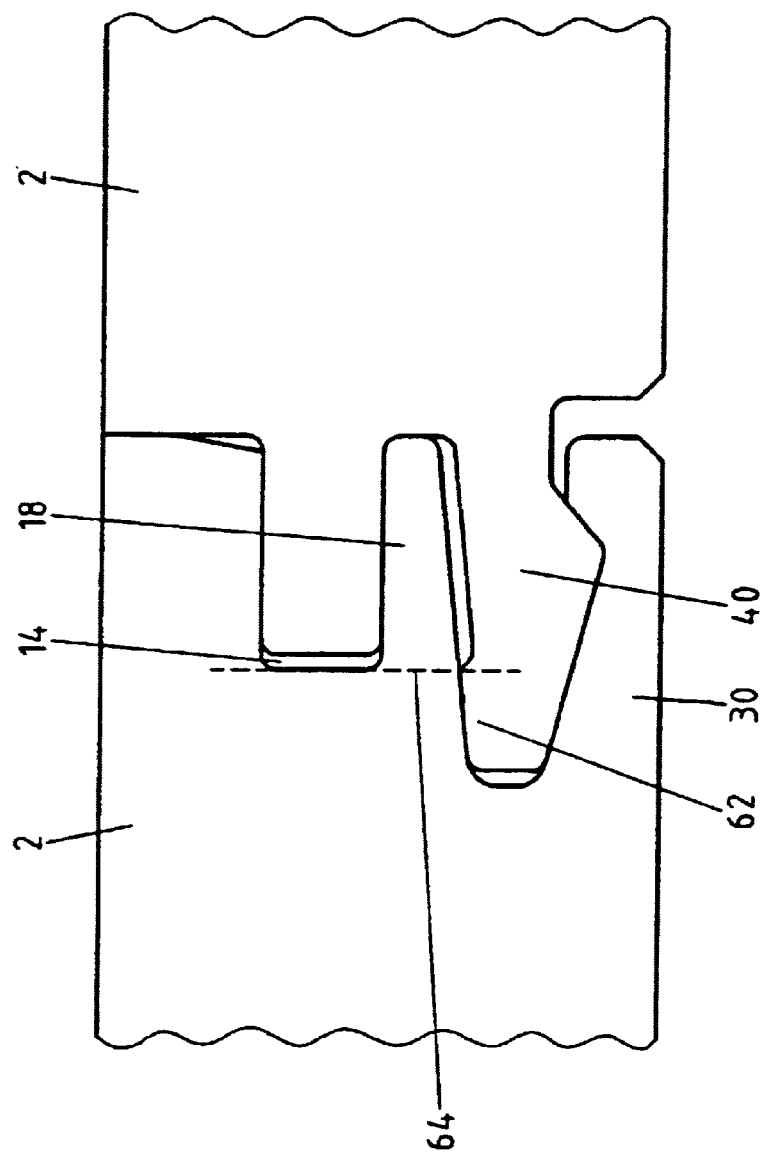
FIG. 7 shows a fourth exemplary embodiment of an edge profile of two interlocked panels according to the invention.

FIGS. 7 and 8 illustrate a fourth exemplary embodiment of the invention. This embodiment differs from the first embodiment by a slightly changed shape of locking tongue 40. In particular, forward end 62 of locking tongue 40 has an enlarged shape, which in the locked state, fits against the bottom of lower lip 18. As shown in FIG. 7, forward end 62 preferably abuts lower lip 18 up to plane 64, which is aligned with the back surface of groove 14. A space still exists between lower lip 18 and the remaining top portion of tongue 40.

Thus it is seen that a panel, particularly a flooring panel, having separate side edge structures for horizontal and vertical interlocking is presented. One skilled in the art will appreciate that the invention can be practiced by other than the described embodiments, which are presented for purposes of illustration and not of limitation, and the invention is limited only by the claims which follow.

We claim:

1. A panel for use as a surface covering, said panel comprising:
   a top (8);
   a bottom (32)
   a first side edge (4) between said panel top (8) and said panel bottom (32), said first side edge (4) comprising;
   a surface (10) extending substantially perpendicular from said panel top (8) along said first side edge (4),
   a first lip (16) extending along said first side edge, said surface (10) forming a part of said first lip (16), said first lip (16) having a bottom (20)
   a second lip (18) extending along said first side edge (4), said second lip (18) having a top (22) substantially parallel to said panel top (8), said second lip (18) also having a bottom (23),
   said first and second lips (16, 18) forming a first groove (14) extending along said first side edge (4), and
   a third lip (30), said second and third lips (18, 30) forming a second groove, said third lip (30) comprising an inclined surface inside said second groove, said incline with respect to said panel bottom (32); and a second side edge (6) between said panel top (8) and said panel bottom (32), said second side edge (6) interlockable with said first side edge (4) of another panel, said second side edge (6) comprising:
    a surface (12) extending substantially perpendicular from said panel top (8) along said second side edge (6),
    a first tongue (24) extending along said second side edge (6), said first tongue having a top (26) and a bottom (28)
    a second tongue (40) extending along said second side edge (6), said second tongue comprising a top (46) and an inclined surface, said incline with respect to said panel bottom (32); wherein,
        said first side edge (4) is interlockable with said second side edge (6) of another panel such that:
            said first side edge surface (10) abuts said second side edge surface (12);
            said first lip bottom (20) abuts said first tongue top (26);
            said second lip top (22) abuts said first tongue bottom (28);
            said third lip inclined surface abuts said second tongue inclined surface; and
            said second lip bottom (23) and said second tongue top (46) have a space (48) between them.

2. The panel of claim 1 wherein:
said second tongue (40) has a distal end surface (50);
said second groove has a back surface (52); and
said first and second side edges (4, 6) interlock such that said distal end surface (50) and said back surface (52) have a space (54) between them.

3. The panel of claim 2 wherein:
said first tongue (24) has a distal end surface (52); and
said second tongue (40) distal end surface (50) extends beyond said first tongue distal end surface (52).

4. The panel of claim 3 wherein:
said first side edge surface (10) has a protrusion (56) extending therefrom;
said second side edge surface (12) has an indentation (58) thereon; and
said first and second side edges (4, 6) interlock such that said indentation (58) receives said protrusion (56).

5. The panel of claim 4 wherein said back surface (52) is beyond a plane aligned with said first side edge surface (10).

6. The panel of claim 5 wherein:
said second tongue (40) has an enlarged distal end top portion (62); and
said first and second side edges (4, 6) interlock such that said distal end top portion (62) abuts said second lip bottom (23), there being a space between said second lip bottom (23) and the remaining top portion of said second tongue (40).

7. A panel for use as a surface covering, said panel comprising:
a top (8);
a bottom (32)
a first side edge (4) between said panel top (8) and said panel bottom (32), said first side edge (4) comprising;
    a surface (10) extending substantially perpendicular from said panel top (8) along said first side edge (4),
    a first lip (16) extending along said first side edge, said surface (10) forming a part of said first lip (16), said first lip (16) having a bottom (20),
    a second lip (18) extending along said first side edge (4), said second lip (18) having a top (22) and a bottom (23)
    said first and second lips (16, 18) forming a first groove (14) extending along said first side edge (4), and
    a third lip (30), said second and third lips (18, 30) forming a second groove, said third lip (30) comprising an inclined surface inside said second groove, said incline with respect to said panel bottom (32); and a second side edge (6) between said panel top (8) and said panel bottom (32), said second side edge (6) interlockable with said first side edge (4) of another panel, said second side edge (6) comprising:
    a surface (12) extending substantially perpendicular from said panel top (8) along said second side edge (6),
    a first tongue (24) extending along said second side edge (6), said first tongue having a top (26) and a bottom (28),
    a second tongue (40) extending along said second side edge (6), said second tongue comprising a top (46) and an inclined surface, said incline with respect to said panel bottom (32); wherein:
    said first tongue (24) has a distal end surface (52);
    said second tongue (40) has a distal end surface (50) that extends beyond said first tongue distal end surface (52); and
    said first side edge (4) is interlockable with said second side edge (6) of another panel such that:
        said first side edge surface (10) abuts said second side edge surface (12);
        said first lip bottom (20) abuts said first tongue top (26);
        said second lip top (22) abuts said first tongue bottom (28);
        said third lip inclined surface abuts said second tongue inclined surface; and
        said second lip bottom (23) and said second tongue top (46) have a space (48) between them.

8. The panel of claim 7 wherein:
said first side edge surface (10) has a protrusion (56) extending therefrom;
said second side edge surface (12) has an indentation (58) thereon; and
said first and second side edges (4, 6) interlock such that said indentation (58) receives said protrusion (56).

9. The panel of claim 8 wherein:
said second groove has a back surface (52); and
said back surface (52) is beyond a plane aligned with said first side edge surface (10).

10. The panel of claim 9 wherein:
said second tongue (40) has an enlarged distal end top portion (62); and
said first and second side edges (4, 6) interlock such that said distal end top portion (62) abuts said second lip bottom (23), there being a space between said second lip bottom (23) and the remaining top portion of said second tongue (40).

11. A panel for use as a surface covering, said panel comprising:
a top (8)
a bottom (32);
a first side edge (4) between said panel top (8) and said panel bottom (32), said first side edge (4) comprising;

a surface (10) extending substantially perpendicular from said panel top (8) along said first side edge (4), a first lip (16) extending along said first side edge, said surface (10) forming a part of said first lip (16), said first lip (16) having a bottom (20), a second lip (18) extending along said first side edge (4), said second lip (18) having a top (22) and a bottom (23), said first and second lips (16, 18) forming a first groove (14) extending along said first side edge (4), and a third lip (30), said second and third lips (18, 30) forming a second groove, said third lip (30) comprising an inclined surface inside said second groove, said incline with respect to said panel bottom (32); and a second side edge (6) between said panel top (8) and said panel bottom (32), said second side edge (6) interlockable with said first side edge (4) of another panel, said second side edge (6) comprising:

a surface (12) extending substantially perpendicular from said panel top (8) along said second side edge (6), a first tongue (24) extending along said second side edge (6), said first tongue having a top (26) and a bottom (28)

a second tongue (40) extending along said second side edge (6), said second tongue comprising a top (46) and an inclined surface, said incline with respect to said panel bottom (32); wherein:

said first side edge surface (10) has a protrusion (56) extending therefrom;

said second side edge surface (12) has an indentation (58) thereon; and said first side edge (4) is interlockable with said second side edge (6) of another panel such that:

said indentation (58) receives said protrusion (56);

said first side edge surface (10) abuts said second side edge surface (12);

said first lip bottom (20) abuts said first tongue top (26);

said second lip top (22) abuts said first tongue bottom (28);

said third lip inclined surface abuts said second tongue inclined surface; and said second lip bottom (23) and said second tongue top (46) have a space (48) between them.

12. The panel of claim 11 wherein:

said second groove has a back surface (52); and said back surface (52) is beyond a plane aligned with said first side edge surface (10).

13. The panel of claim 12 wherein:

said second tongue (40) has an enlarged distal end top portion (62); and said first and second side edges (4, 6) interlock such that said distal end top portion (62) abuts said second lip bottom (23), there being a space between said second lip bottom (23) and the remaining top portion of said second tongue (40).

14. A panel for use as a surface covering, said panel comprising:

a top (8);

a bottom (32);

a first side edge (4) between said panel top (8) and said panel bottom (32), said first side edge (4) comprising;

a surface (10) extending substantially perpendicular from said panel top (8) along said first side edge (4), a first lip (16) extending along said first side edge, said surface (10) forming a part of said first lip (16), said first lip (16) having a bottom (20), a second lip (18) extending along said first side edge (4), said second lip (18) having a top (22) and a bottom (23), said first and second lips (16, 18) forming a first groove (14) extending along said first side edge (4), and a third lip (30), said second and third lips (18, 30) forming a second groove, said third lip (30) comprising an inclined surface inside said second groove, said incline with respect to said panel bottom (32); and a second side edge (6) between said panel top (8) and said panel bottom (32), said second side edge (6) interlockable with said first side edge (4) of another panel, said second side edge (6) comprising:

a surface (12) extending substantially perpendicular from said panel top (8) along said second side edge (6), a first tongue (24) extending along said second side edge (6), said first tongue having a top (26) and a bottom (28), a second tongue (40) extending along said second side edge (6), said second tongue comprising a top (46) and an inclined surface, said incline with respect to said panel bottom (32); wherein:

said second groove has a back surface (52);

said back surface (52) lies further outward on said first side edge (4) than a plane aligned with said first side edge surface (10); and said first side edge (4) is interlockable with said second side edge (6) of another panel such that:

said first side edge surface (10) abuts said second side edge surface (12);

said first lip bottom (20) abuts said first tongue top (26);

said second lip top (22) abuts said first tongue bottom (28);

said third lip inclined surface abuts said second tongue inclined surface; and said second lip bottom (23) and said second tongue top (46) have a space (48) between them.

15. The panel of claim 14 wherein:

said second tongue (40) has an enlarged distal end top portion (62); and said first and second side edges (4, 6) interlock such that said distal end top portion (62) abuts said second lip bottom (23), there being a space between said second lip bottom (23) and the remaining top portion of said second tongue (40).

16. A panel for use as a surface covering, said panel comprising:

a top (8);

a bottom (32);

a first side edge (4) between said panel top (8) and said panel bottom (32), said first side edge (4) comprising;

a surface (10) extending substantially perpendicular from said panel top (8) along said first side edge (4), a first lip (16) extending along said first side edge, said surface (10) forming a part of said first lip (16), said first lip (16) having a bottom (20), a second lip (18) extending along said first side edge (4), said second lip (18) having a top (22) and a bottom (23), said first and second lips (16, 18) forming a first groove (14) extending along said first side edge (4), and a third lip (30), said second and third lips (18, 30) forming a second groove, said third lip (30) comprising an inclined surface inside said second groove, said incline with respect to said panel bottom (32); and a second side edge (6) between said panel top (8) and said panel bottom (32), said second side edge (6) interlockable with said first side edge (4) of another panel, said second side edge (6) comprising:
- a surface (12) extending substantially perpendicular from said panel top (8) along said second side edge (6),
- a first tongue (24) extending along said second side edge (6), said first tongue having a top (26) and a bottom (28),
- a second tongue (40) extending along said second side edge (6), said second tongue comprising a top (46) and an inclined surface, said incline with respect to said panel bottom (32); wherein:
  - said second tongue (40) has an enlarged distal end top portion (62); and
  - said first side edge (4) is interlockable with said second side edge (6) of another panel such that:
    - said first side edge surface (10) abuts said second side edge surface (12);
    - said first lip bottom (20) abuts said first tongue top (26);
    - said second lip top (22) abuts said first tongue bottom (28);
    - said third lip inclined surface abuts said second tongue inclined surface; and
    - said distal end top portion (62) abuts said second lip bottom (23), there being a space between said second lip bottom (23) and the remaining top portion of said second tongue (40).

17. A panel for use as a surface covering, said panel comprising:
   a top;
   a bottom;
   a first side edge between said top and said bottom, said first side edge having vertical and horizontal locking structures; and
   a second side edge between said top and said bottom, said second side edge interlockable with said first side edge of another panel, said second side edge having vertical and horizontal locking structures that respectively mate with said first side edge vertical and horizontal locking structures; wherein:
      said vertical and horizontal locking structures of said first and second side edges are integrally formed with said panel;
      said vertical locking structures form no part of said horizontal locking structures and said horizontal locking structures form no part of said vertical locking structures;
      said vertical locking structures of said first and second side edges each comprise two surfaces substantially parallel to said top; and
      said horizontal locking structures of said first and second side edges each comprise a surface substantially perpendicular to said top, said horizontal locking structures of said first and second side edges of respective panels mate with each other such that said substantially perpendicular surfaces have a space between them.

18. The panel of claim 17 wherein:
   said first side edge has first and second lips that form a groove; and
   said second side edge has a tongue; wherein:
      said tongue and said groove form said vertical locking structures.

19. The panel of claim 18 wherein:
   said first side edge has a third lip, said third lip having an inclined surface; and
   said second side edge has a second tongue, said second tongue having a top, a bottom, and an inclined surface on said second tongue bottom; wherein:
      said second tongue and said third lip form said horizontal locking structures.

20. A panel for use as a surface covering, said panel comprising:
   a top;
   a bottom;
   a first side edge between said top and said bottom, said first side edge having integral first, second, and third lips, said first and second lips forming a first groove and said second and third lips forming a second groove, said first groove comprising two surfaces substantially parallel to said top; and
   a second side edge between said top and said bottom, said second side edge interlockable with said first side edge of another panel, said second side edge having integral first and second tongues; wherein:
      said first side edge is interlockable with said second side edge of another panel such that:
         said first tongue and said first groove limit panel movement in a first direction; and
         said second tongue and said second groove limit panel movement in a second direction, said second direction substantially perpendicular to said first direction, said second tongue and said second groove each having a surface substantially parallel to said first direction, said substantially parallel surfaces having a space between them.

* * * * *